US011909438B2

United States Patent
Salehiomran

(10) Patent No.: US 11,909,438 B2
(45) Date of Patent: Feb. 20, 2024

(54) DIGITAL BEACON FOR FREE-SPACE OPTICAL COMMUNICATION

(71) Applicant: Lumentum Operations LLC, San Jose, CA (US)

(72) Inventor: Ali Salehiomran, Gatineau (CA)

(73) Assignee: Lumentum Operations LLC, San Jose, CA (US)

( * ) Notice: Subject to any disclaimer, the term of this patent is extended or adjusted under 35 U.S.C. 154(b) by 8 days.

(21) Appl. No.: 17/708,768

(22) Filed: Mar. 30, 2022

(65) Prior Publication Data

US 2023/0111293 A1 Apr. 13, 2023

Related U.S. Application Data

(60) Provisional application No. 63/253,366, filed on Oct. 7, 2021.

(51) Int. Cl.
*H04B 10/11* (2013.01)
*H04B 10/118* (2013.01)

(52) U.S. Cl.
CPC ............ *H04B 10/11* (2013.01); *H04B 10/118* (2013.01)

(58) Field of Classification Search
CPC .................................................. H04B 10/11
USPC ........................................................... 398/115
See application file for complete search history.

(56) References Cited

U.S. PATENT DOCUMENTS

| 9,485,019 | B1 * | 11/2016 | Kim ..................... H04J 14/02 |
| 10,039,103 | B2 * | 7/2018 | Wang ................ H04W 72/0453 |
| 10,420,108 | B2 * | 9/2019 | Wang ................. H04B 7/18513 |
| 2004/0208523 | A1 * | 10/2004 | Carrick ................ H04B 10/071 398/32 |
| 2017/0026132 | A1 * | 1/2017 | Wang ................. H04B 10/0795 |

FOREIGN PATENT DOCUMENTS

| AU | 2011201987 A1 * | 11/2011 | ........... H04B 10/112 |
| CN | 103312645 B * | 4/2016 | |
| JP | 2011188381 A * | 9/2011 | |
| JP | 5203406 B2 * | 6/2013 | |

* cited by examiner

*Primary Examiner* — Abbas H Alagheband
(74) *Attorney, Agent, or Firm* — Harrity & Harrity, LLP

(57) ABSTRACT

A transmitter may include a digital signal processor (DSP) to generate an electrical signal associated with a beacon and a data signal. The transmitter may include an electro-optical component to convert the electrical signal to an optical signal to be transmitted by the transmitter. The beacon and the data signal may be on a common wavelength in the optical signal. A power of the beacon within the optical signal may be based on a value of an amplitude modulation factor applied to the beacon by the DSP in association with generating the electrical signal.

20 Claims, 6 Drawing Sheets

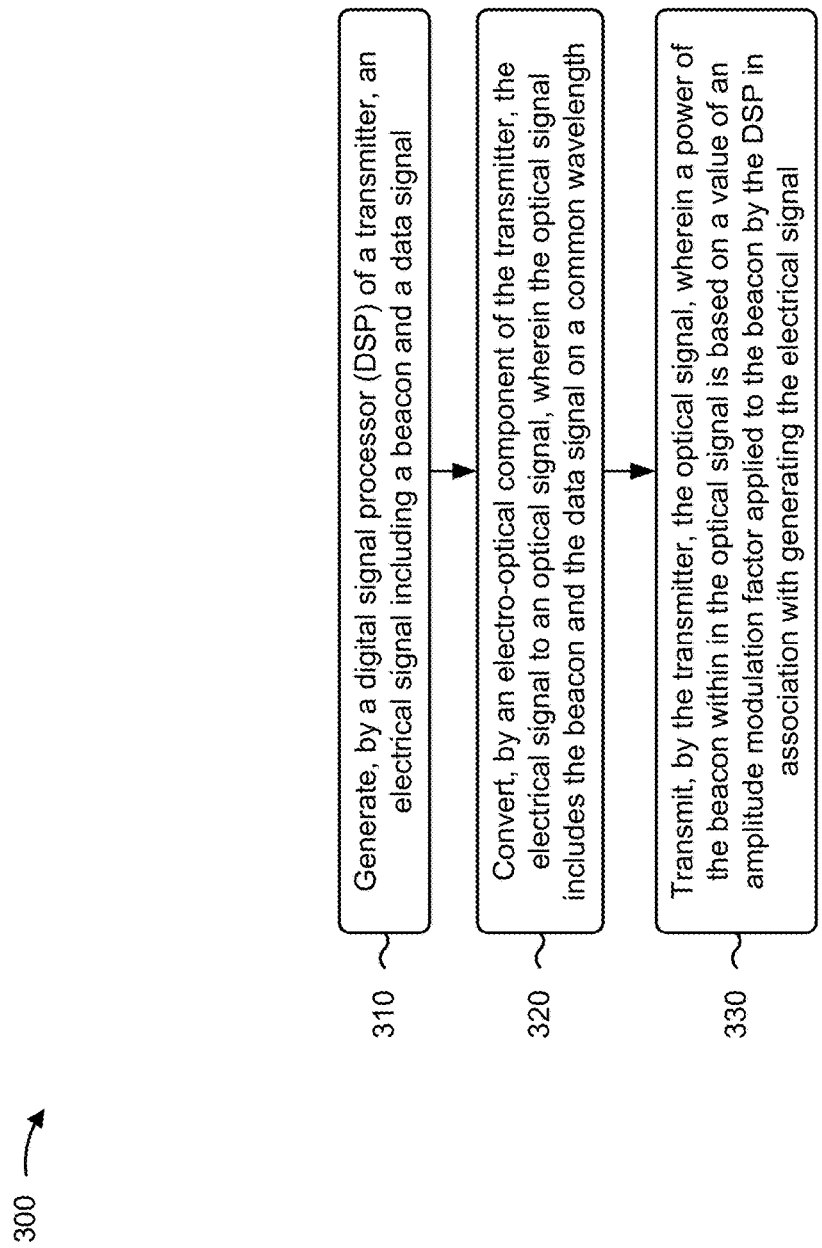

DIGITAL BEACON FOR FREE-SPACE OPTICAL COMMUNICATION

CROSS-REFERENCE TO RELATED APPLICATION

This patent application claims priority to U.S. Provisional Patent Application No. 63/253,366, filed on Oct. 7, 2021, and entitled "BEACON-LESS INTER-SATELLITE OPTICAL COMMUNICATION." The disclosure of the prior application is considered part of and is incorporated by reference into this patent application.

TECHNICAL FIELD

The present disclosure relates generally to free-space optical communication and, more particularly, to implementation of a digital beacon in a free-space optical communication system.

BACKGROUND

A pointing, acquisition, and tracking (PAT) technique can be used to ensure that line of sight is maintained between two devices of a free-space optical communication system. For example, PAT can be used to ensure that line of sight is maintained between a pair of satellites and, therefore, can be used to enable inter-satellite optical communication. An optical signal used by the PAT process is referred to as beacon. In general, the PAT process enables the beacon to be tracked over time by each device (e.g., each satellite) in order to facilitate establishment and maintenance of a reliable optical communication link between the two devices.

SUMMARY

In some implementations, a transmitter includes a digital signal processor (DSP) to generate an electrical signal associated with a beacon and a data signal; and an electro-optical component to convert the electrical signal to an optical signal to be transmitted by the transmitter, wherein the beacon and the data signal are on a common wavelength in the optical signal, and wherein a power of the beacon within the optical signal is based on a value of an amplitude modulation factor applied to the beacon by the DSP in association with generating the electrical signal.

In some implementations, a receiver includes an electro-optical component to convert a received optical signal to an electrical signal, wherein the received optical signal includes a beacon and a data signal on a common wavelength, and wherein a power of the beacon within the optical signal is based on a value of an amplitude modulation factor; and a DSP to: determine the value of the amplitude modulation factor based on the electrical signal, remove the beacon from the electrical signal based on the value of the amplitude modulation factor, and detect the data signal carried in the electrical signal based on removing the beacon from the electrical signal.

In some implementations, a method includes generating, by a DSP of a transmitter, an electrical signal including a beacon and a data signal; converting, by an electro-optical component of the transmitter, the electrical signal to an optical signal, wherein the optical signal includes the beacon and the data signal on a common wavelength; and transmitting, by the transmitter, the optical signal, wherein a power of the beacon within the optical signal is based on a value of an amplitude modulation factor applied to the beacon by the DSP in association with generating the electrical signal.

BRIEF DESCRIPTION OF THE DRAWINGS

FIG. 3 is a flowchart of an example process relating to a digital beacon for free-space optical communication, as described herein.

DETAILED DESCRIPTION

The following detailed description of example implementations refers to the accompanying drawings. The same reference numbers in different drawings may identify the same or similar elements.

Figure 1A:
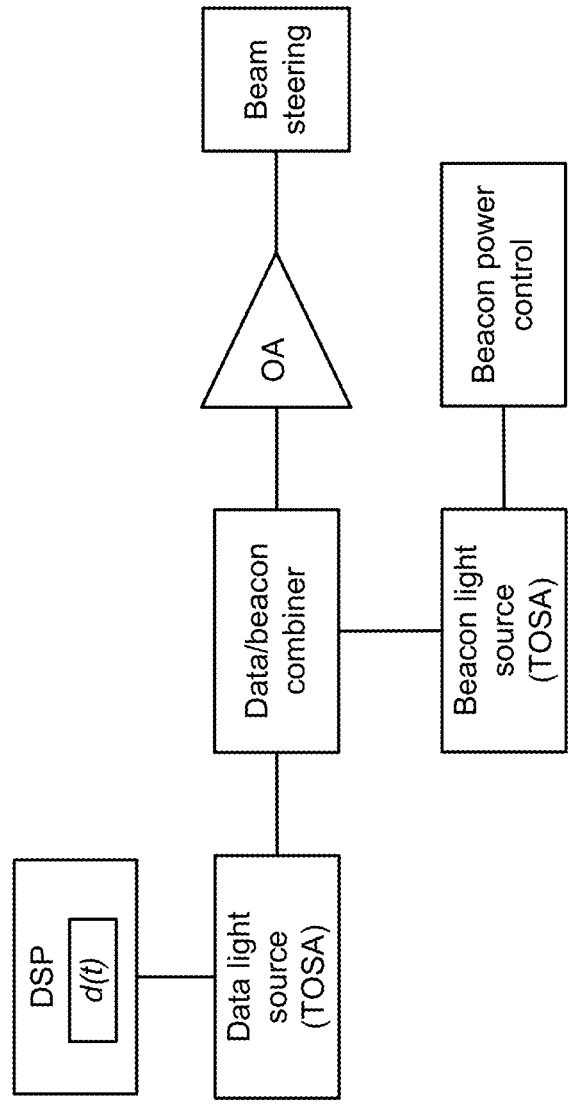
FIGS. 1A and 1B are diagrams associated with an example of a conventional approach for providing a beacon used for PAT.
Figure 1B:
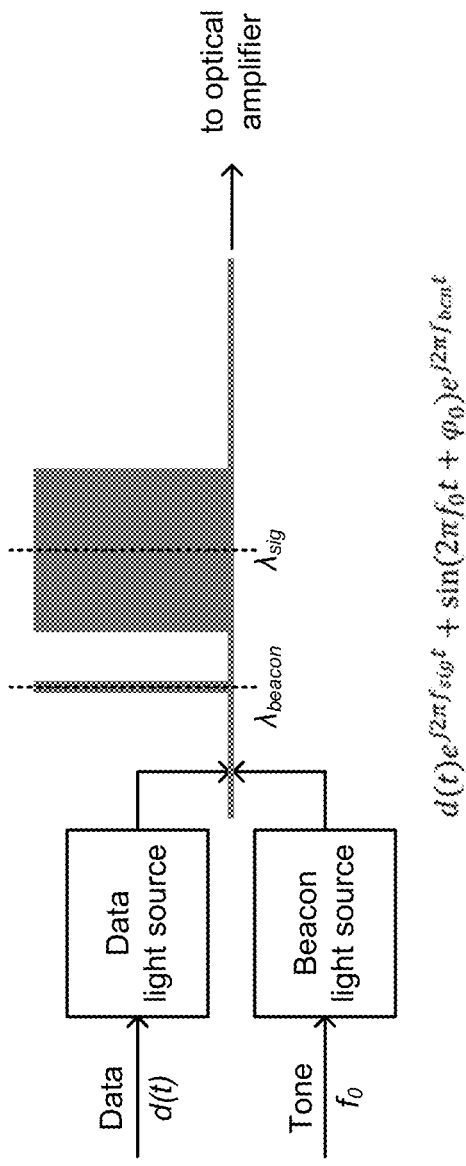

A conventional approach for providing a beacon used for PAT is to include an additional light source (e.g., a light source other than that of a data transceiver), and to modulate the additional light source with a relatively low frequency modulation tone (e.g., to improve a signal to noise ratio at a receiver). FIGS. 1A and 1B are diagrams associated with examples of the conventional approach for providing a beacon used for PAT. As shown in FIG. 1A, a conventional transmitter includes a data light source (e.g., in a first transmitter optical subassembly (TOSA)), a DSP to provide a data signal d(t), a beacon light source (e.g., in a second TOSA), a beacon power control component, a data/beacon combiner, an optical amplifier, and a beam steering component. Notably, the conventional transmitter requires separate light sources for the data signal and the beacon because the data signal and the beacon have different wavelengths ($\lambda$sig and $\lambda$beacon, respectively), a combiner to combine the optical signals from the two light sources before transmission, and it may also include a separate beacon power control component to control the power of the beacon light source.

FIG. 1B is a representative illustration of an optical signal provided by the conventional transmitter described above. As shown and as noted above, the data light source (e.g., a light source modulated by the data signal d(t)) is separate from the beacon light source (e.g., a light source modulated by a tone of frequency $f_0$). As shown, in the optical signal provided by the conventional transmitter, the beacon and the data signal are separated within a bandwidth of operation (e.g., they have different wavelengths $\lambda$beacon and $\lambda$sig, respectively). Notably, the beacon uses a portion of the spectrum of operation, meaning that the portion of the spectrum used by the beacon cannot be used for data transmission.

Similar complexity is present in a receiver that implements the conventional approach. For example, a conventional receiver includes a beam collector, an optical amplifier, a beam splitter, a data photodetector (e.g., in a first receiver optical subassembly (ROSA)), a DSP, and a beacon photodetector (e.g., in a second ROSA). Notably, the conventional receiver requires separate photodetectors for the data signal and the beacon, and the conventional receiver requires the beam splitter to split the received optical signal.

In summary, a free-space optical communication system that utilizes the conventional approach for providing a beacon for PAT requires two light sources at the transmitter and two photodetectors at the receiver because the conventional approach requires the beacon light source to be implemented separately (e.g., on different wavelength) from the data signal light source. As a result, the size, cost, and complexity of the system may be increased.

Some implementations described herein enable implementation of a digital beacon in a free-space optical communication system. For example, in some implementations, a transmitter, may include a DSP to generate an electrical signal (e.g., a digital signal), where the DSP is configured such that the electrical signal includes a beacon and a data signal (rather than the beacon and the data signal being separate). The transmitter may further include an electro-optical component (e.g., a TOSA, a transmitter/receiver optical subassembly (TROSA), a bidirectional optical subassembly (BOSA), or the like) to convert the electrical signal to an optical signal to be transmitted by the transmitter. The beacon and the data signal may share a common wavelength in the optical signal optical signal, or, phrased in reverse, the optical signal may have a single wavelength which includes both the beacon and the data signal. Here, a power of the beacon within the optical signal is based on a value of an amplitude modulation factor $m_0$ applied to the beacon by the DSP in association with generating the electrical signal. The transmitter may then transmit the optical signal for reception by a receiver. The receiver may include an electro-optical component (e.g., a ROSA, a TROSA, a BOSA, or the like) to convert the received optical signal to an electrical signal (e.g., a digital signal). The receiver may further include a DSP to determine the value of the amplitude modulation factor $m_0$ based on the electrical signal. The DSP may then remove the beacon from the electrical signal based on the value of the amplitude modulation factor, and therefore the DSP can detect the data signal carried in the electrical signal. Additional details are provided below.

In some implementations, functionality associated with data transmission/reception and functionality associated with a beacon are combined through implementation of the digital beacon in the manner described above, which reduces a number of components needed in the optical communication system. For example, the use of the digital beacon eliminates a need for a dedicated light source for the beacon (e.g., a standalone beacon laser), thereby reducing the number of components in the optical communication system, as well as cost and complexity of the optical communication system. Further, the implementations described herein increase available bandwidth for data transmission in the spectrum because the beacon does not use any additional bandwidth in the spectrum of operation.

Figure 2A:
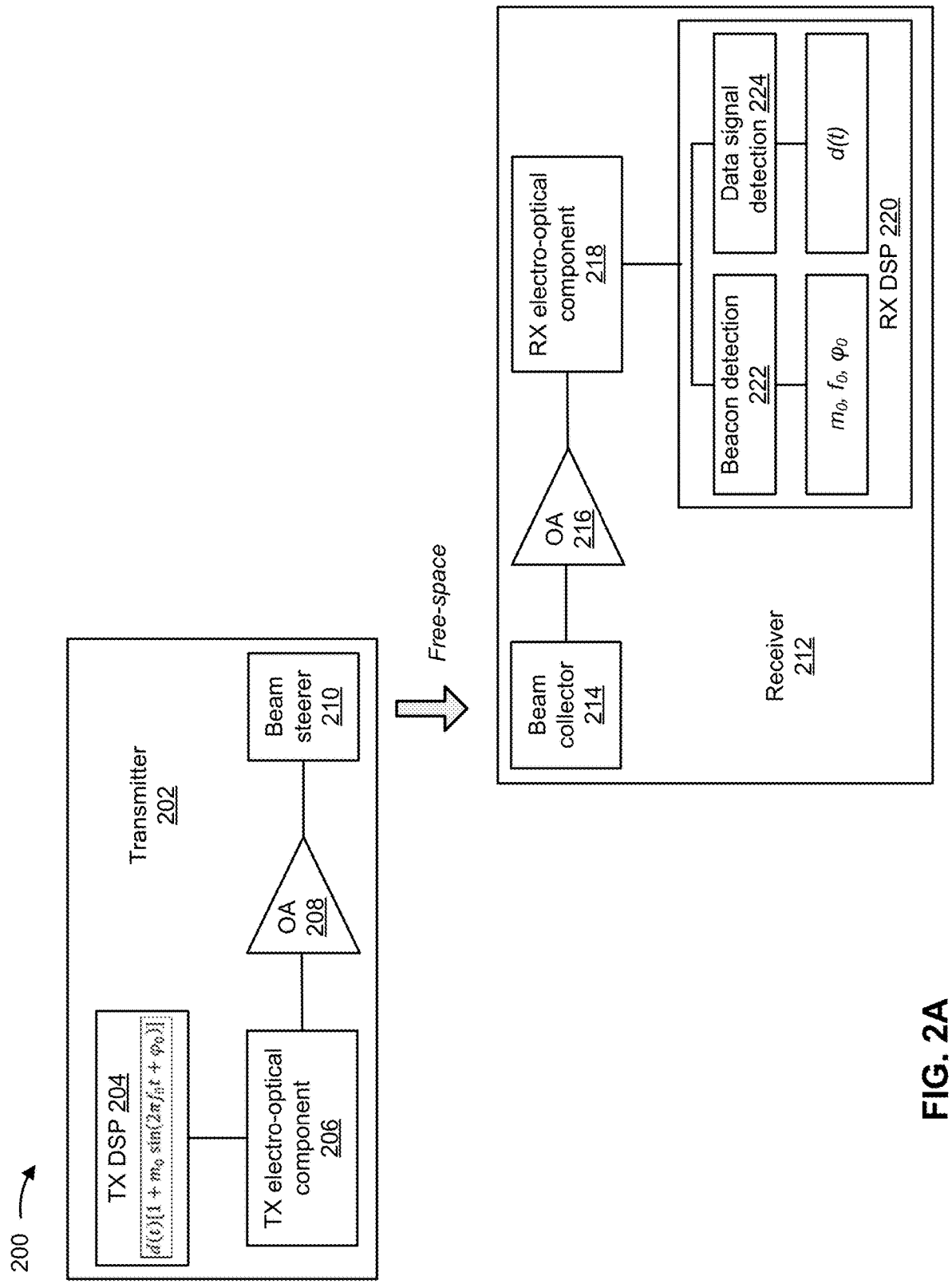
FIGS. 2A-2C are diagrams associated with a digital beacon for free-space optical communication, as described herein.
Figure 2B:
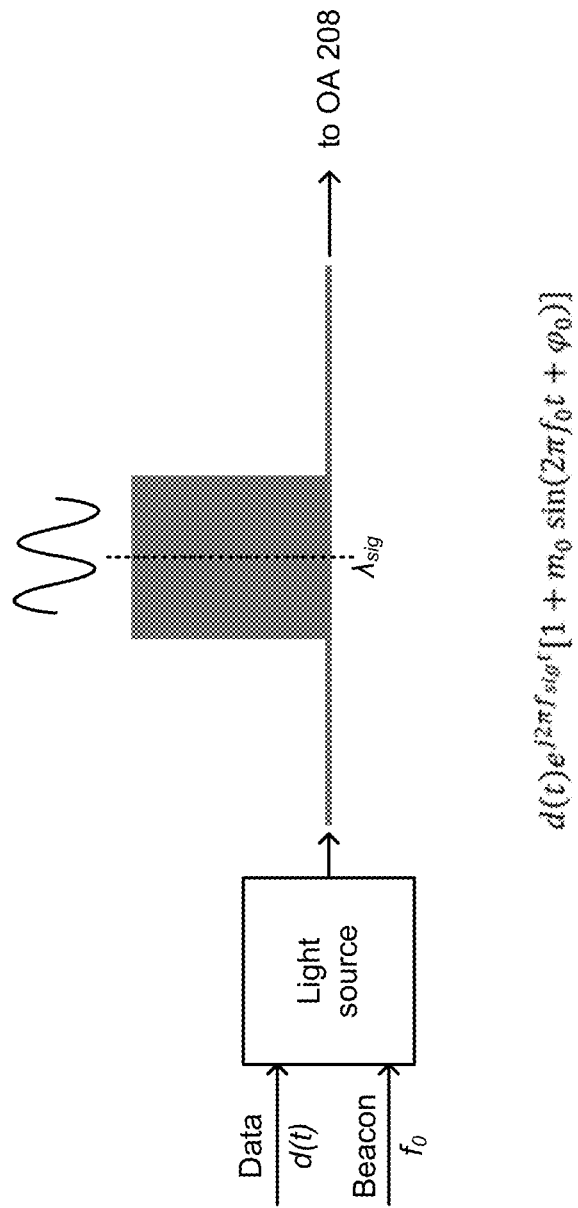
Figure 2C:
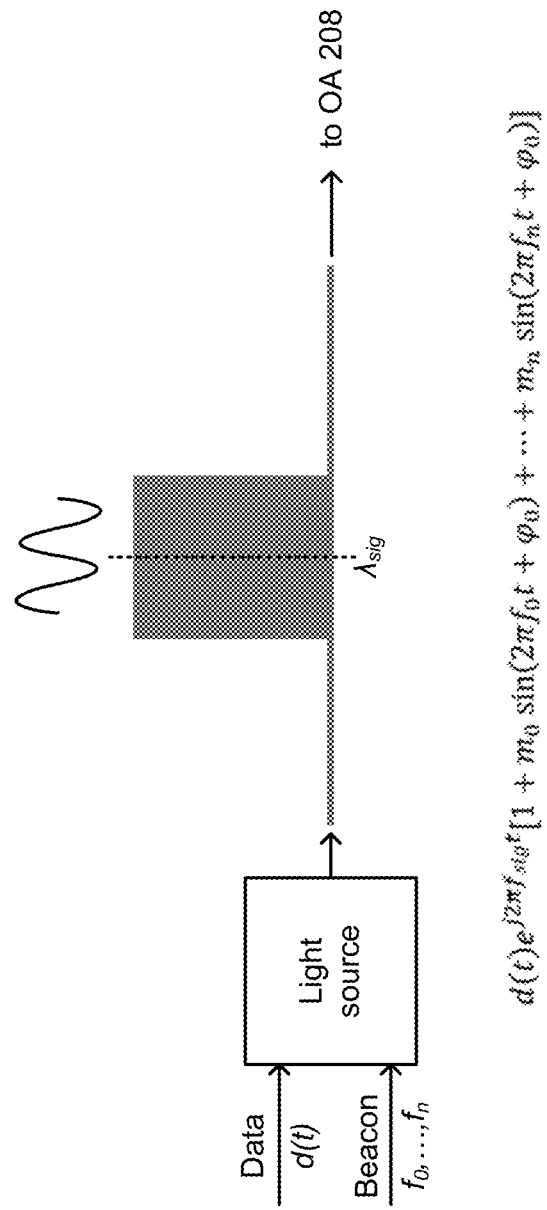

FIGS. 2A-2C are diagrams associated with a digital beacon for free-space optical communication, as described herein. FIG. 2A is a diagram of an example free-space optical communication system 200 in which the digital beacon can be implemented. As shown in FIG. 2A, the free-space optical communication system 200 includes a transmitter 202 and a receiver 212.

The transmitter 202 is a component capable of generating and transmitting an optical signal including a digital beacon, as described herein. In some implementations, the transmitter 202 may be included in a free-space optical communication system. For example, the transmitter 202 may be included a satellite or a ground station of a satellite-based communication system. As shown, the transmitter 202 may include a transmitter (TX) DSP 204, a TX electro-optical component 206, an optical amplifier (OA) 208, and a beam steerer 210.

The TX DSP 204 includes a component to generate an electrical signal (e.g., a digital signal) associated with a beacon and a data signal. For example, the TX DSP 204 may in some implementations generate apply the following function in association with generating an electrical signal to be provided to the TX electro-optical component 206:

$$d(t)[1+m_0 \sin(2\pi f_0 t+\varphi_0)]$$

where $d(t)$ represents a data signal, $f_{sig}$ represents a frequency of the light, $m_0$ represents an amplitude modulation factor applied to the beacon, $f_0$ represents a frequency of the beacon, and $\varphi_0$ represents a phase of the beacon. By applying the above function, the TX DSP 204 can combine the beacon with the data signal (i.e., the TX DSP 204 can create a digital beacon).

In some implementations, the TX DSP 204 can control a power of the beacon through the amplitude modulation factor $m_0$ applied in association with generating the electrical signal. That is, a power of the beacon within the optical signal to be generated by the TX electro-optical component 206 is based on a value of the amplitude modulation factor $m_0$ applied to the beacon by the TX DSP 204 in association with generating the electrical signal. For example, if the TX DSP 204 increases the value of the amplitude modulation factor $m_0$, then a power of the beacon on the optical signal generated by the transmitter 202 increases. Conversely, if the TX DSP 204 decreases the value of the amplitude modulation factor $m_0$, then the power of the beacon in the optical signal generated by the transmitter decreases.

In some implementations, the TX DSP 204 modifies the value of the amplitude modulation factor $m_0$ as needed in association with performing PAT. For example, in an early stage of PAT (e.g., during initial acquisition), the TX DSP 204 may set the value of the amplitude modulation factor $m_0$ to a comparatively higher value (e.g., 1) in a particular range of possible values (e.g., from 0 to 1) so that the power of the beacon is maximized in the optical signal. Here, the TX DSP 204 may hold the value of the data signal d(t) at a constant value (e.g., a value of 1), meaning that data is not being transmitted during this stage. At a later stage of PAT (e.g., after initial acquisition is complete), the TX DSP 204 may set the value of the amplitude modulation factor $m_0$ to a comparatively lower value (e.g., less than or equal to approximately 0.1) in the particular range of values to reduce the power of the beacon in the optical signal. Notably, although the power of the beacon may be reduced, the value of the amplitude modulation factor $m_0$ may be set to a value that provides a beacon with sufficient power to enable tracking (e.g., a value of approximately 0.1).

In some implementations, the TX DSP 204 may set the value of the amplitude modulation factor $m_0$ to be lower than a threshold in order to reduce noise added to the data signal by the beacon. In some implementations, the threshold may be in a range from approximately 0.01 (e.g., 1%) to approximately 0.10 (e.g., 10%), such as 0.05 (e.g., 5%). In some implementations, after or concurrently with reducing the power of the beacon, the TX DSP 204 may add the data signal to the optical signal by varying the value of the data signal d(t) so that the value of the data signal (d)t is representative of the data (rather than holding the value of the data signal d(t) at a constant value). In further operation, if the transmitter 202 and the receiver 212 start to lose line of sight, the value of the amplitude modulation factor $m_0$, and therefore the power of the beacon, can be increased in order to enable acceptable tracking. In some cases, the TX DSP 204 may stop the data signal during the time period during which the power of the beacon is increased in association with performing tracking (e.g., in the manner described above).

In this way, the TX DSP 204 can be configured to implement a digital beacon. The TX DSP 204 differs from the DSP utilized in the conventional approach described above because the TX DSP 204 generates an electrical signal based on both the beacon and the data signal (rather than generating the data signal only). Further, the beacon as implemented by the TX DSP 204 is a digital beacon (rather than a hardware-based beacon) which can be transmitted with the data signal on a common optical wavelength. Additionally, only one connection is between the TX DSP 204 the (single) TX electro-optical component 206 of the transmitter 202 is needed (rather than two connections to two different optical subassemblies as needed in the conventional transmitter). That is, the data signal and the beacon can be communicated within the transmitter 202 via a single connection between the TX DSP 204 and the TX electro-optical component 206.

The TX electro-optical component 206 includes a component to convert the electrical signal generated by the TX DSP 204 to an optical signal to be transmitted by the transmitter 202. For example, the TX electro-optical component 206 may include a TOSA, a TROSA, a BOSA, or another type of component capable of converting an electrical signal to an optical signal. Notably, a light source of the TX electro-optical component 206 may be the only light source of the transmitter 202 that is used in association with transmitting the optical signal and the optical signal may have a single common wavelength for the electrical signal containing the beacon and data signal. As described above, a power of the beacon within the optical signal generated by the TX electro-optical component 206 is based on a value of the amplitude modulation factor $m_0$ applied to the beacon by the TX DSP 204 in association with generating the electrical signal.

The OA 208 includes a component to amplify the optical signal generated by the TX electro-optical component 206. For example, the OA 208 may receive the optical signal generated by the TX electro-optical component 206 and amplify the optical signal such that, at an output of the OA 208, the optical signal has higher optical power as compared to the optical power of the optical signal at the input of the OA 208. In some implementations, amplification is provided by pumping (i.e., providing energy to) a gain medium of the OA 208.

The beam steerer 210 includes one or more components to manage or otherwise control a direction of propagation of the optical signal in free-space. For example, the beam steerer 210 may include a mechanical mirror-based gimbal or beam-director component, a galvanometer mechanism that rotates one or more mirrors, one or more prisms (e.g., one or more Risley prisms), a set of phased-array optics, a microelectromechanical systems (MEMS) including micro-mirrors, or one or more other types of components that can be manipulated to enable transmission of the optical signal in a given direction (e.g., toward the receiver 212).

The receiver 212 is a device receiving and processing an optical signal including a digital beacon, as described herein. In some implementations, the receiver 212 may be included in a free-space optical communication system. For example, the receiver 212 may be included a satellite or a ground station of a satellite-based communication system. As shown, the receiver 212 may include a beam collector 214, an OA 216, a receiver (RX) electro-optical component 218, and an RX DSP 220. The receiver 212 may receive an optical signal including a digital beacon and a data signal on a single common wavelength.

The beam collector 214 includes one or more components to enable reception of an optical signal propagating in free-space (e.g., the optical signal transmitted by the transmitter 202). For example, the beam collector 214 may include a mechanical mirror-based gimbal or beam-director component, a galvanometer mechanism that rotates one or more mirrors, one or more prisms (e.g., one or more Risley prisms), a set of phased-array optics, a MEMS including micro-mirrors, or one or more other types of components that can be manipulated to enable reception of an optical signal in free-space.

The OA 216 includes a component to amplify the optical signal received by the beam collector 214. For example, the OA 216 may receive the received optical signal from the beam collector 214 and amplify the received optical signal such that, at an output of the OA 216, the received optical signal has higher optical power as compared to the optical power of the received optical signal at the input of the OA 216. In some implementations, amplification is provided by pumping (i.e., providing energy to) a gain medium of the OA 216.

The RX electro-optical component 218 includes a component to convert the received optical signal to an electrical signal. For example, the RX electro-optical component 218 may include a ROSA, a TROSA, a BOSA, or another type of component capable of converting an optical signal to an electrical signal. Notably, a photodetector of the RX electro-optical component 218 may be the only photodetector of the receiver 212 that is used in association with receiving the optical signal. That is, the receiver 212 may include a single photodetector associated with receiving the optical signal and the optical signal may include a beacon and a data signal sharing a common wavelength. As described above, a power of the beacon within the optical signal received by the RX electro-optical component 218 is based on a value of the amplitude modulation factor $m_0$ applied to the beacon by the TX DSP 204 in association with generating the electrical signal at the transmitter 202.

The RX DSP 220 includes one or more components to process the electrical signal as generated by the RX electro-optical component 218. For example, as shown in FIG. 2A, the RX DSP 220 may include a beacon detection component 222 and a data signal detection component 224. In some implementations, the beacon detection component 222 performs digital filtering (e.g., using a band-pass filter) on the electrical signal (i.e., the digitized version of the received optical signal) and determines one or more characteristic of the beacon from the filtered electrical signal. The one or more characteristics may include, for example, the value of the amplitude modulation factor $m_0$, the frequency $f_0$, the phase coo, or another characteristic of the beacon. In some implementations, the data signal detection component 224 removes the beacon from the digital signal using the one or more characteristics of the beacon (e.g., the value of the amplitude modulation factor $m_0$) as determined by the beacon detection component 222, which enables the data signal detection component 224 to detect the data signal d(t) carried in the electrical signal. In some implementations, the data signal detection component 224 is configured to perform demodulation of the data signal d(t) to recover the data from the data signal (d)t.

In this way, the RX DSP 220 can be configured to process a digital beacon. Notably, only one connection is between the RX DSP 220 the (single) RX electro-optical component 218 of the receiver 212 is needed (rather than two connections to two different optical subassemblies as needed in the conventional receiver).

FIG. 2B is a representative illustration of an example optical signal provided by the transmitter 202. As shown and as noted above, the light source of the TX electro-optical component 206 is modulated by both the data signal d(t) and the beacon with the tone of frequency $f_0$ according to the formula:

$$d(t)e^{j2\pi f_{sig}t}[1+m_0 \sin(2\pi f_0 t+\varphi_0)]$$

As shown in FIG. 2B, in the optical signal provided by the transmitter 202, the beacon is digitally implemented in the data signal provided by the transmitter 202. Notably, the beacon does not use a portion of the spectrum of operation, meaning that use of the digital beacon increases an available bandwidth for data transmission (e.g., as compared to available bandwidth when the conventional transmitter is used).

In some implementations the beacon may include a single tone. For example, as shown and described with respect to FIGS. 2A and 2B, the beacon may include a single tone at the frequency $f_0$ to which the amplitude modulation factor $m_0$ is applied.

Alternatively, in some implementations, the beacon includes multiple (e.g., at least two tones), where each of the multiple tones is associated with a respective amplitude modulation factor $m_n$ and a respective frequency $f_n$, where the respective frequencies are different. In some implementations, the beacon can be readily extended to include multiple tones because the beacon is implemented digitally into the data stream by the TX DSP 204. For example, a frequency of a given tone is a mathematical function, meaning that the frequency of a given tone is not limited to a particular range. In some implementations, the lack of frequency limitation enables the TX DSP 204 to (e.g., dynamically) modify the frequency of one or more tones of the beacon. In some implementations, implementing a beacon including multiple tones can improve a signal to noise ratio, improve security, or improve anti-jamming capabilities associated with the PAT process. Notably, the RX DSP 220 may process the received optical signal to determine one or more characteristics of each tone of the beacon and remove each tone in a manner similar to that described above.

FIG. 2C is a representative illustration of an example optical signal provided by the transmitter 202 for a beacon including multiple tones. As shown, the light source of the TX electro-optical component 206 is modulated by both the data signal d(t) and the beacon with the multiple tones of frequency $f_0$ through $f_n$ according to the formula:

$$d(t)e^{j2\pi f_{sig}t}[1+m_0 \sin(2\pi f_0 t+\varphi_0)+ \ldots +m_n \sin(2\pi f_n t+\varphi_0)]$$

where $m_n$ represents an amplitude modulation factor applied to a given tone and $f_n$ represents a frequency of the given tone.

As shown in FIG. 2C, in the optical signal provided by the transmitter 202, the beacon is digitally implemented in the data signal provided by the transmitter 202. Notably, although the beacon includes multiple tones, the beacon does not use a portion of the spectrum of operation, rather it uses the same portion of the spectrum (e.g., wavelength) as the data signal, meaning that use of the digital beacon increases an available bandwidth for data transmission (e.g., as compared to available bandwidth when the conventional transmitter is used).

As indicated above, FIGS. 2A-2C are provided as an example. Other examples may differ from what is described with regard to FIGS. 2A-2C. The number and arrangement of devices and components shown in FIGS. 2A-2C are provided as an example. In practice, there may be additional devices and/or components, fewer devices and/or components, different devices and/or components, or differently arranged devices and/or components than those shown in FIGS. 2A-2C. Furthermore, two or more devices and/or components shown in FIGS. 2A-2C may be implemented within a single device and/or component, or a single device and/or component shown in FIGS. 2A-2C may be implemented as multiple, distributed devices. Additionally, or alternatively, a set of devices (e.g., one or more devices) and/or components (e.g., one or more components) shown in FIGS. 2A-2C may perform one or more functions described as being performed by another set of devices and/or components shown in FIGS. 2A-2C.

FIG. 3 is a flowchart of an example process relating to a digital beacon for free-space optical communication, as described herein. In some implementations, one or more process blocks of FIG. 3 are performed by one or more components of a transmitter (e.g., transmitter 202).

As shown in FIG. 3, process 300 may include generating an electrical signal including a beacon and a data signal (block 310). For example, a DSP of the transmitters (e.g., the TX DSP 204 of the transmitter 202) may generate an electrical signal including a beacon and a data signal, as described above.

As further shown in FIG. 3, process 300 may include converting the electrical signal to an optical signal, wherein the optical signal includes the beacon and the data signal on a common wavelength (block 320). For example, an electro-optical component of the transmitter (e.g., the TX electro-optical component 206 of the transmitter 202) may convert the electrical signal to an optical signal, wherein the optical signal includes the beacon and the data signal on a common wavelength, as described above.

As further shown in FIG. 3, process 300 may include transmitting the optical signal, wherein a power of the beacon within the optical signal is based on a value of an amplitude modulation factor applied to the beacon by the DSP in association with generating the electrical signal (block 330). For example, the transmitter may transmit the optical signal, wherein a power of the beacon within the optical signal is based on a value of an amplitude modulation factor applied to the beacon by the DSP in association with generating the electrical signal, as described above.

Process 300 may include additional implementations, such as any single implementation or any combination of implementations described below and/or in connection with one or more other processes described elsewhere herein.

In a first implementation, the beacon includes at least two tones, each tone associated with a respective amplitude modulation factor and a respective frequency factor, wherein the respective frequency factors of the at least two tones are different.

In a second implementation, alone or in combination with the first implementation, process 300 includes modifying the value of the amplitude modulation factor in association with performing PAT.

In a third implementation, in combination the second implementation and during a first PAT phase, modifying the value of the amplitude modulation factor comprises increasing the value of the amplitude modulation factor to increase the power of the beacon in the optical signal.

In a fourth implementation, in combination with the third implementation, process 300 includes holding a value of the data signal at a constant value during the first PAT phase.

In a fifth implementation, in combination with the second implementation and during a second PAT phase, modifying the value of the amplitude modulation factor comprises decreasing the value of the amplitude modulation factor to decrease the power of the beacon in the optical signal.

In a sixth implementation, in combination with the fifth implementation, process 300 includes varying a value of the data signal to represent data to be transmitted in the optical signal during the second PAT phase.

In a seventh implementation, alone or in combination with one or more of the first through sixth implementations, the data signal and the beacon are communicated via a single connection between the DSP and the electro-optical component.

In an eighth implementation, alone or in combination with one or more of the first through seventh implementations, the transmitter is included in a free-space optical communication system.

In a ninth implementation, alone or in combination with one or more of the first through eighth implementations, the transmitter includes a single light source associated with transmitting the optical signal at the common wavelength.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter, comprising:
   a digital signal processor (DSP) to generate an electrical signal associated with a beacon and a data signal; and
   an electro-optical component to convert the electrical signal to an optical signal to be transmitted by the transmitter,
   wherein the beacon and the data signal are on a common wavelength in the optical signal,
   wherein a power of the beacon within the optical signal is based on a value of an amplitude modulation factor applied to the beacon by the DSP in association with generating the electrical signal, and
   wherein the DSP is configured to at least one of:
   increase the value of the amplitude modulation factor to increase the power of the beacon within the optical signal, or
   decrease the value of the amplitude modulation factor to decrease the power of the beacon within the optical signal.

2. The transmitter of claim 1, wherein the beacon includes at least two tones, each tone associated with a respective amplitude modulation factor and a respective frequency factor, wherein the respective frequency factors of the at least two tones are different.

3. The transmitter of claim 1, wherein the data signal and the beacon are communicated via a single connection between the DSP and the electro-optical component.

4. The transmitter of claim 1, wherein the transmitter is included in a free-space optical communication system.

5. The transmitter of claim 1, wherein the transmitter includes a single light source associated with transmitting the optical signal on the common wavelength.

6. The transmitter of claim 1, wherein, in association with performing pointing, acquisition, and tracking (PAT), the DSP is configured to increase the value of the amplitude modulation factor to increase the power of the beacon within the optical signal during a first PAT phase.

7. The transmitter of claim 6, wherein the DSP is further to hold a value of the data signal at a constant value during the first PAT phase.

8. The transmitter of claim 6, wherein the DSP is configured to decrease the value of the amplitude modulation factor to decrease the power of the beacon within the optical signal during a second PAT phase.

9. The transmitter of claim 8, wherein the DSP is further to vary a value of the data signal to represent data to be transmitted in the optical signal during the second PAT phase.

10. The transmitter of claim 8, wherein the DSP is further to:
hold a value of the data signal at a constant value during the first PAT phase, and
vary a value of the data signal to represent data to be transmitted in the optical signal during the second PAT phase.

11. A method, comprising:
generating, by a digital signal processor (DSP) of a transmitter, an electrical signal associated with a beacon and a data signal;
converting, by an electro-optical component of the transmitter, the electrical signal to an optical signal, wherein the optical signal includes the beacon and the data signal on a common wavelength;
transmitting, by the transmitter, the optical signal,
wherein a power of the beacon within the optical signal is based on a value of an amplitude modulation factor applied to the beacon by the DSP in association with generating the electrical signal; and
in association with performing pointing, acquisition, and tracking (PAT), at least one of:
increasing the value of the amplitude modulation factor to increase the power of the beacon within the optical signal, or
decreasing the value of the amplitude modulation factor to decrease the power of the beacon within the optical signal.

12. The method of claim 11, wherein the beacon includes at least two tones, each tone associated with a respective amplitude modulation factor and a respective frequency factor, wherein the respective frequency factors of the at least two tones are different.

13. The method of claim 11, wherein increasing the value of the amplitude modulation factor to increase the power of the beacon in the optical signal is performed during a first PAT phase.

14. The method of claim 13, further comprising holding a value of the data signal at a constant value during the first PAT phase.

15. The method of claim 13, wherein decreasing the value of the amplitude modulation factor to decrease the power of the beacon in the optical signal is performed during a second PAT phase.

16. The method of claim 15, further comprising varying a value of the data signal to represent data to be transmitted in the optical signal during the second PAT phase.

17. The method of claim 15, further comprising:
holding a value of the data signal at a constant value during the first PAT phase; and
varying a value of the data signal to represent data to be transmitted in the optical signal during the second PAT phase.

18. A transmitter, comprising:
a digital signal processor (DSP) to generate an electrical signal associated with a beacon and a data signal; and
an electro-optical component to convert the electrical signal to an optical signal to be transmitted by the transmitter,
wherein the beacon and the data signal are communicated via a single connection between the DSP and the electro-optical component,
wherein a power of the beacon within the optical signal is based on a value of an amplitude modulation factor applied to the beacon by the DSP in association with generating the electrical signal, and
wherein, in association with performing pointing, acquisition, and tracking (PAT), the DSP is configured to at least one of:
increase the value of the amplitude modulation factor to increase the power of the beacon within the optical signal, or
decrease the value of the amplitude modulation factor to decrease the power of the beacon within the optical signal.

19. The transmitter of claim 18, wherein the beacon includes at least two tones, each tone associated with a respective amplitude modulation factor and a respective frequency factor, wherein the respective frequency factors of the at least two tones are different.

20. The transmitter of claim 18, wherein the transmitter includes a single light source associated with transmitting the optical signal on a common wavelength.

* * * * *